United States Patent [19]

Steer

[11] Patent Number: 4,685,300
[45] Date of Patent: Aug. 11, 1987

[54] SEAL MEANS FOR A MASTER CYLINDER

[75] Inventor: John E. Steer, South Bend, Ind.

[73] Assignee: Allied Corporation, Morristown, N.J.

[21] Appl. No.: 835,833

[22] Filed: Mar. 3, 1986

[51] Int. Cl.⁴ .............................................. B60T 11/20
[52] U.S. Cl. ...................................... 60/562; 60/589;
92/168; 92/170; 277/165
[58] Field of Search ................. 60/585, 588, 589, 562;
92/170, 168 B; 277/165

[56] References Cited

U.S. PATENT DOCUMENTS

| | | | |
|---|---|---|---|
| 2,758,444 | 8/1956 | White | 60/589 |
| 2,961,832 | 11/1960 | Randol | 60/589 |
| 4,228,726 | 10/1980 | Rinker | 92/168 B |
| 4,249,381 | 2/1981 | Gaiser | 60/589 |
| 4,304,416 | 12/1981 | Oshima | 277/165 |
| 4,455,832 | 6/1984 | Gaiser | 60/592 |
| 4,474,005 | 10/1984 | Steer | 60/589 |
| 4,514,982 | 5/1985 | Bach | 60/589 |
| 4,527,395 | 7/1985 | Gaiser | 92/170 |
| 4,559,781 | 12/1985 | Steer | 60/589 |

Primary Examiner—Abraham Hershkovitz
Attorney, Agent, or Firm—Leo H. McCormick, Jr.; Ken C. Decker

[57] ABSTRACT

A master cylinder (10) having a sleeve (24) for positioning first (22) and second (30) seal members within a bore (14) of the housing (12). The first (22) and second (30) members each have a primary seal (52), a retainer (58) and secondary seals (54 or 55). The primary seals (52) have a base member (60), a peripheral ring (64) and a flexible bellows section (66). The retainers (56) have a groove (70) for holding the base member (60), radial slots (74, 74') connect to a source of fluid and either a rib (100) or projection (94) for positioning the secondary seals (54 or 56). First (38) and second (40) pistons which engage the first (30) and second (22) seal members, have communication passages (80, 82) through which the radial slots (74, 74') (75, 75') are connected to first (46) and second (42) chamber. In response to an input force, the first (38) and second (40) pistons move into the first (46) and second (42) chambers, respectively, to pressurize fluid therein after interrupting communication through the passages (74, 74') (75, 75'). The fluid pressure acts on the base members (60, 60') to seal the chambers (46, 42) from the source of fluid (23). The sleeve (24) radially expands in response to the pressurized fluid in chambers (46) and (42). The flexible bellows sections (66, 66') allow said peripheral rings (64, 64') to radially expand and maintain a substantial constant sealing force with the sleeve (24). As the first (38) and second (40) pistons move out of the chambers (46, 42), a vacuum may be created therein. The flexible sections (66, 66') allow the peripheral rings (64, 64') radially contract and permit the vacuum to draw fluid into the chambers (46, 42) to assure that a substantially constant volume of fluid is available to effect a brake application.

12 Claims, 2 Drawing Figures

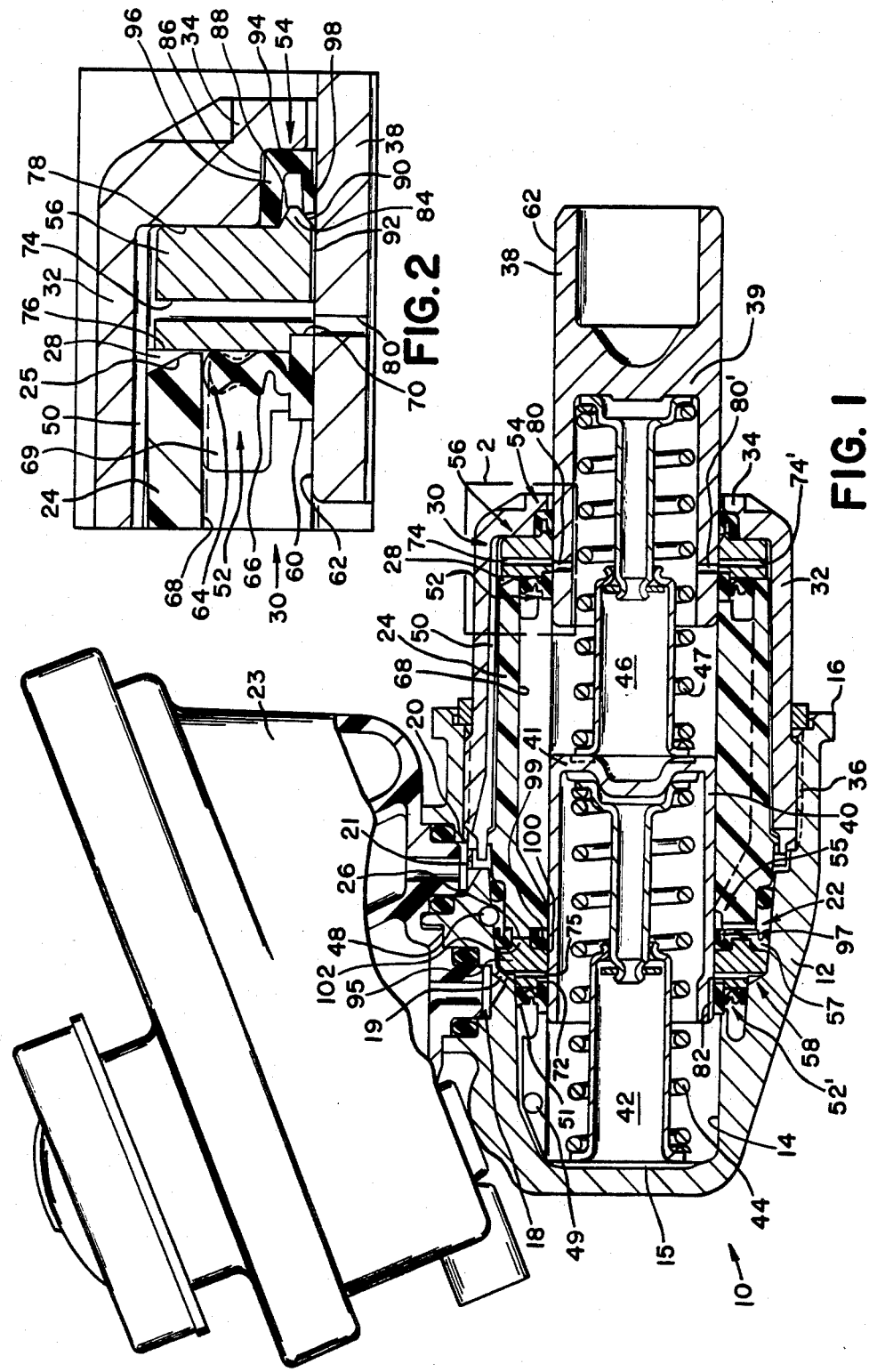

SEAL MEANS FOR A MASTER CYLINDER

This invention relates to seal means for a master cylinder wherein a flexible section that connects a base member to a peripheral ring allows the peripheral ring to radially expand to compensate for expansion of member sealing on the radially outer surface of the peripheral ring and assure that the fluid pressure generated during a brake application is not reduced through a high pressure leak path to the reservoir.

In U.S. Pat. No. 4,249,381, a master cylinder displaces fluid from a housing by moving a pair of pistons relative to a pair of fixed sealing members to generate fluid pressure during braking. A housing bore is provided to receive the pair of pistons, a sleeve cooperating with the sealing members and a bearing supporting one of the pistons and retaining the sleeve in a fixed position within the bore. The housing length extends over substantially the entire length for the parts received within the bore. In addition, the housing bore includes a substantial length exposed to the fluid pressure developed in one of the pair of pressure chambers.

U.S. Pat. No. 4,474,002 discloses a master cylinder having a housing with a shorter length to reduce the weight and size of the master cylinder and also to provide a shorter length for that portion of the housing bore exposed to fluid pressure in the one pressure chamber so that the area for potential leakage is reduced.

U.S. Pat. No. 4,559,781 discloses a seal for a master cylinder having a flexible section that permits axial movement of the peripheral section of the seal to permit fluid compensation between first and second operational chambers to provide for a fast fill function.

In all of the known master cylinders wherein a sleeve is inserted to locate the compensator seals, the housing and sleeve are made of different materials. During periods when high pressure is present, the housing and sleeve expand at different rates and as a result the relationship between the sealing surfaces can be effected.

The present invention is characterized in that the sealing member includes a flexible section that allows the peripheral sealing ring to radially expand and thereby maintain a substantially uniform relationship between the sealing surfaces.

In addition, the retainer for the primary seal has a series of radial slots that communicate fluid to either slots or radial openings in the pistons in the master cylinder during a rest or release position to provide for fluid compensation between operational chambers and a reservoir. On movement of the pistons, the radial openings or slots therein move past the base of the primary seals to interrupt communication between the reservoir and the operational chamber. The base members engage the pistons to assure the operational chambers are sealed. Later on withdrawal of the pistons from the operational chamber, the flexible sections that are connected to the peripheral ring allow the ring to move and allow communication between the reservoir and chamber if additional fluid is needed to maintain the fluid pressure level therein at reservoir pressure. Only after the pistons have returned to the rest position is fluid communication again reinstituted through the radial slots or openings.

A further advantage of this invention occurs since the seals are not extruded into the radial slots of the retainer during the development of fluid pressure in the master cylinder the possibility of damaging the seals is reduced.

It is an object of this invention to provide a master cylinder with primary seals which are interchangeable and provide a butt seal with a retainer and operational pistons during the development of pressurized fluid to effect a brake application.

These advantages and objects should be apparent from reading the specification while viewing the drawings.

FIG. 1 is a sectional view of a master cylinder which includes sealing members made according to the principals of this invention; and FIG. 2 is an enlarged view of the circumscribed area 2 of FIG. 1.

The master cylinder 10 shown in FIG. 1 has a housing 12 with a stepped bore 14 located therein. The external surface of the housing has a flange 16 on the end thereof and first and second compensator ports 18 and 20. A plastic reservoir 23 of the type disclosed in U.S. patent application Ser. No. 06/740,668 now U.S. Pat. No. 4630443, is attached to the compensator ports. A seal member 22 is located in bore 14 adjacent opening 19 of compensator port 18. A sleeve 24 has a first end 26 that engages the seal member 22 and a second end 28. A seal member 30 is located adjacent the second end 28. A cylindrical end member 32 with a flange 34 on the end thereof engages seal member 30 on being attached to housing 12 by threaded connection 36. A piston assembly 40 engages seal member 22 and with housing 12 forms a chamber 42 within bore 14. A spring mechanism 44 is located between the bottom 15 of bore 14 and end wall 41 on piston 40 defines the limits for chamber 42. A piston assembly 38, which is designed to be attached to an input member engages seal member 30 and with sleeve 24 and piston assembly 40 defines a chamber 46. A spring mechanism 47 located between the end 41 of piston assembly 40 and end wall 39 of piston assembly 38 defines the limits for chamber 46. In response an input force communicated to piston 38, piston 38 moves into chamber 46 and pressurizes fluid therein which is communicated through outlet port 48 to a wheel brake system. As piston 48 moves, spring assembly 38 moves piston 40 into chamber 42 to pressurize fluid therein which is communicated through outlet port 49. As the fluid pressure in chamber 46 increases, sleeve 24 may expand and engage the interior of cylindrical end member 32. As sleeve 24 changes radial dimension, a portion of seal member 30 correspondingly expands and contracts to maintain a good seal between passage 50 connected to opening 21 of compensator port 20. Thus, all the fluid pressure developed in chamber 46 is available for effecting a brake application.

Seal members 22 and 30 are identical with respect to the primary seals 52, 52' and only have minor physical differences with respect to retainer 56 and 58. As a result only seal member 30 and secondary seals 54 and 55 will be further described with respect to the differences therein.

The primary sealing component 52 has an annular base 60 which engages the peripheral surface 62 on piston 38. The base 60 is connected to a pheripheral ring 64 by a flexible bellows section 66. The resiliency of the bellows section 66 urges peripheral ring 64 into constant engagement with the interior surface 68 on sleeve 24. The primary sealing component 52 is designed such that it is completely reversible when inserted into groove 70 on retainer 56 or groove 72 on retainer 58.

Retainer 56 which is shaped like a disc has a plurality of radial openings 74, 74' which form an extension of slot 50 that is connected to compensator port 20. Piston 38 has a plurality of radial openings 80, 80' which are connected with openings 74, 74' in the rest position shown in FIGS. 1 and 2. Similarly piston 40 has a series of axial slots 82, only one is shown that connect radial openings 75 in retainer 58 to chamber 42. Retainer 56 has a front face 76 that engages the end 28 of the sleeve 24 while a rear face 78 engages flange 34 on the cylindrical end member 32. The rear face 78 has an annular projection 84 that extends toward a groove 86 formed in flange 34. Annular projection 84 has an apex with sloping sides 88 and 90. Side 90 extends to the inner diameter 92 on retainer 56 and forms a wedge for holding the secondary sealing member 54.

The secondary sealing member 54 has an annular base 94 that engages flange 34. A first leg 96 extends from base 94 and is compressed between sloping side 88, face 78 and flange 34 to define a first sealing surface. A second leg 98 extends from base 94 and is urged toward sloping surface 90 by flange 38. A groove in either surface 90 or leg 98 provides a flow path that prevents fluid from being locked in the space between legs 96 and 98. An edge 99 on leg 98 has a smaller diameter than the piston 38 and is stretched over peripheral surface 62 on piston 38 to form a second sealing surface.

In seal member 22, retainer 58 has a rib 100 for retaining the secondary seal member 55 and 57 and sleeve 24 has an annular projection 102 for urging base 95 toward retainer 58 and legs 97 and 99 into sealing engagement with face 14 and piston 40 respectively.

Pistons 38 and 40 of the master cylinder 10 are shown in FIG. 1 in the rest position. Fluid communication is provided between reservoir 22 and chamber 42 and 46 by way of compensator port 18, radial openings 75, and slots 82 and compensator port 20, passage 50, radial openings 74, 74' in retainer 56 and radial opening 80, 80' in piston 38, respectively. In response to an input force applied to piston 38, pistons 38 and 40 move to interrupt fluid communication through radial openings 80, 80' and slots 82. As soon as this interruption occurs, fluid pressure begins to build up in chambers 42 and 46. The fluid pressure in chambers 42 and 46 act on seals 52, 52' to retain the fluid pressure therein. Base members 60, 60' engage the retainers 56 and 58 and pistons 38 and 40 to form a butt seal. This butt seal is such that at no time is any of the material in the base members 60, 60' extruded into the radial opening 74 or 75 and thus are protected against damage.

As the fluid pressure in chamber 46 increases, sleeve 24 expands in a manner illustrated by the difference between dashed line 69 and solid line 68. As sleeve 24 expands, end 28 moves on a radial plane. Flexible bellows 66 allows peripheral ring 64 to move at the same rate as end 28. The shape of the peripheral ring 64 is such that the fluid pressure in chamber 46 urges the same into engagement with the interior surface 68 on sleeve 24 and face 76 on retainer 56 to form a high pressure seal.

On withdrawal of pistons 38 and 40 from chambers 46 and 42, respectively, a vacuum can be created in these chambers. Since the vacuum is lower than the fluid pressure in the fluid in the reservoir and fluid in passages 50 and 51, the flexible bellows 66, 66' allows the peripheral ring 64 to move in an axial direction away from retainer 56 and 58 to permit fluid to flow through slots 25 in sleeve 24 and passage 51 into chambers 46 and 42 respectively, to dissipate the vacuum therein and thereby assure that the pressure of fluid in the chambers 46 and 42 is above or equal and that of the environment or reservoir 22. Because retainer 56 remains stationary and end 28 forms an abutting engagement when changes occur in the radial dimension of surface 68 the relationship between slots 25 and ring 64 remain constant to maintain the extrusion gap small such that the ring is not damaged from such changes. When spring members 44 and 48 have returned pistons 38 and 40 to the rest position shown in FIG. 1, communication is again reestablished through radial passages 74, 74' and 75, 75' to allow for compensation of fluid in chambers 42 and 46 from reservoir 22.

I claim:

1. In a master cylinder having a sleeve for positioning seal means within a bore of a master cylinder housing and first and second pistons located in first and second chambers formed in the bore, said seal means engaging said first and second pistons and controlling communication between a source of fluid and said first and second chambers, said first and second pistons responding to an input force by moving to pressurize fluid within said first and second chambers, said pressurized fluid acting on and radially moving said sleeve within said bore, the improvement wherein said seal means comprises:
   a first annular retainer located adjacent a first end of said sleeve, said first annular retainer having a plurality of radial slots that form a first extension of a flow path between the source of fluid and the first chamber and a groove located on its inner diameter;
   a first annular base member that engages said first piston, said first piston having a series of radial openings located adjacent an end thereof in the first chamber, said first annular base member engaging the peripheral portion of said first piston between said end and radial openings when said first piston is in the rest position, said first annular base member having a first end and a second end, said second end being located in said groove of said first annular retainer, said second end of said first annular base member controlling fluid flow communication through the radial openings to the first chamber, said radial openings in said first piston moving from alignment with said radial slots and past said second end of said first annular base member during pressurizing of fluid in said first chamber, said pressurized fluid acting on said first end of said base member to form a tight seal between said base member and first piston;
   a first peripheral ring that engages said sleeve; and
   a first flexible bellows section that connects said first annular base member with said first peripheral ring, said first flexible bellows section allowing said first peripheral ring to radially expand with said sleeve to provide a substantially constant engagement force between said peripheral ring and sleeve to assure that pressurized fluid is retained in said first chambers as the fluid pressure therein increases.

2. The master cylinder as recited in claim 1 wherein said sleeve includes:
   a series of radial slots located on the first end thereof, said annular retainer engaging said first end of the sleeve and with said radial slots forming a second extension for the flow path between said source and the first chamber, said first piston on moving out of said first chamber may create a vacuum therein, said first flexible bellows section of said seal means contracting to allow said first peripheral ring to move away from said sleeve and allow the vacuum in the first chamber to draw fluid into the first chamber.

3. The master cylinder as recited in claim 2 wherein said first annular retainer includes:
an annular projection located adjacent the inner diameter, said annular projection having an apex with substantially uniform sloping sides, one of said sloping sides extending to the inner diameter and the other of said sloping sides extending to an end face on said retainer, said end face engaging a flange on said master cylinder housing.

4. The master cylinder as recited in claim 3 wherein said seal means further includes:
a first annular leg member joined to a second annular leg member, said first leg member engaging said first piston and the sloping side of said annular projection adjacent the inner diameter of the retainer and the second leg member engaging said flange of the master cylinder housing and other sloping side of said annular projection, said engagement of said first and second leg member with the sloping sides and first piston sealing the bore from the surrounding environment.

5. The master cylinder as recited in claim 1 wherein said seal means further includes:
a second annular base member that engages said second piston;
a second peripheral ring that engages said master cylinder housing;
a second flexible bellows section that connects the second peripheral ring with the second annular base member; and
a second annular retainer located between a second end of said sleeve and a shoulder in the bore of said master cylinder housing, said second annular retainer having a land on its inner diameter for engaging and holding said second base member within said bore.

6. The master cylinder as recited in claim 5 wherein said second annular retainer includes:
a plurality of radial openings that connect the source of fluid to the second piston, said second piston having a series of axial slots on its periphery that connect said radial openings with the second chamber, said second piston on moving into said second chamber interrupting the communication between said axial slots and radial opening to seal the second chamber and pressurize fluid therein, said pressurized fluid in said second chamber acting on said second base member to establish a fluid tight seal between said second retainer and second piston.

7. The master cylinder as recited in claim 6 wherein said second annular retainer includes:
an annular rib for positioning a first leg on the sealing means that is urged into engagement with said housing and a second leg on the sealing means that is urged into engagement with a peripheral surface of said second piston by a projection that extends from said sleeve, said first and second legs on engagement with said second piston and housing sealing the first chamber from the remainder of the bore.

8. The master cylinder is recited in claim 7 wherein said second piston on moving out of said second chamber may create a vacuum therein, said second flexible bellows section of said seal means allowing said second peripheral ring to move away from said bore and allow the vacuum in the second chamber to draw fluid into the second chamber.

9. In a master cylinder having a sleeve for positioning seal means within a bore of a master cylinder housing, said seal means engaging first and second pistons for controlling communication between a source of fluid and first and second operational chambers within said bore, said first and second pistons responding to an input force by moving to pressurize fluid within said first and second chambers, respectively, said pressurized fluid acting on an radially moving said sleeve within said bore, the improvement wherein said seal means comprises:
a first annular retainer located adjacent a first end of said sleeve, said first annular retainer having a plurality of radial slots that form a first extension of a first flow path between the source of fluid and the first chamber, said sleeve having a radial groove located on the end thereof, said first annular retainer engaging said end of said sleeve to form a second extension of said first flow path through said radial grooves to said first chamber;
a first annular base member that engages said first piston, said first piston having a series of radial openings located adjacent an end thereof in the first chamber, said first annular base member engaging the peripheral portion of said first piston between said end and radial openings when the first piston is in the rest position, said radial openings in said first piston moving from alignment with said radial slots and past said first base member during pressurizing of fluid in said first chamber, said pressurized fluid acting on said first base member to form a tight seal between said retainer and first piston;
a first peripheral ring that engages said sleeve; and
a first flexible bellows section that connects said first annular base member with said first peripheral ring, said first flexible bellows section allowing said first peripheral ring to radially expand with said sleeve to provide a substantially constant engagement force between said peripheral ring and sleeve to assure that pressurized fluid is retained in said chambers as the fluid pressure therein increases, said first piston on moving out of said first chamber may create a vacuum therein, said first flexible bellows section of said seal means allowing said first peripheral ring to move away from said sleeve and first annular retainer and allow the vacuum in the first chamber to draw fluid into the first chamber through said second extension of said first flow path prior to the establishment of the alignment of said radial openings in said first piston with the radial slots in said first annular retainer, said fluid flow through said second extension assures that said first chamber is substantially filled with fluid at all times.

10. The master cylinder as recited in claim 9 wherein said first annular base member includes:
a first end and a second end, said second end engaging said first annular retainer, said second end controlling the flow communication through said radial openings in said first piston, said fluid pressure in said first chamber acting on said first end to urge said base member into engagement with said first piston and form said tight seal therewith.

11. The master cylinder as recited in claim 10 wherein said seal means further includes:

a second annular base member that engages said second piston;

a second peripheral ring that engages said bore;

a second flexible section that connects the second peripheral ring with the second annular base member; and a second annular retainer located between a second end of said sleeve and a shoulder in the bore of said master cylinder housing, said second annular retainer having a land on its inner diameter for engaging and holding said second base member within said bore.

12. The master cylinder as recited in claim 11 wherein said second annular retainer includes:

a plurality of radial openings that connect the source of fluid to the second piston, said second piston having a series of axial slots on its periphery that connect said radial openings with the second chamber, said second piston on moving into said second chamber interrupting the communication between said axial slots and radial opening to seal the second chamber and pressurize fluid therein, said pressurized fluid in said second chamber acting on said second base member to establish a fluid tight seal between said second retainer and second piston.

* * * * *